(12) United States Patent
Nomura et al.

(10) Patent No.: US 7,706,153 B2
(45) Date of Patent: Apr. 27, 2010

(54) DC-DC CONVERTER

(75) Inventors: Fujio Nomura, Kawasaki (JP);
Yoshirou Aoki, Yokohama (JP);
Masayasu Doi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 144 days.

(21) Appl. No.: 11/365,523

(22) Filed: Mar. 2, 2006

(65) Prior Publication Data

US 2007/0053210 A1 Mar. 8, 2007

(30) Foreign Application Priority Data

Sep. 7, 2005 (JP) ............................. 2005-259689

(51) Int. Cl.
*H02M 3/335* (2006.01)
(52) U.S. Cl. ........................................ 363/16; 363/131
(58) Field of Classification Search .................. 363/15, 363/16, 123, 131
See application file for complete search history.

(56) References Cited

U.S. PATENT DOCUMENTS

| | | | |
|---|---|---|---|
| 4,814,962 A | 3/1989 | Magalhaes et al. | |
| 5,353,212 A | 10/1994 | Loftus, Jr. | |
| 5,499,175 A * | 3/1996 | Noro | 363/16 |
| 5,570,279 A * | 10/1996 | Venkataramanan | 363/127 |
| 6,324,081 B1 * | 11/2001 | Sakamoto et al. | 363/25 |
| 6,728,118 B1 | 4/2004 | Chen et al. | |
| 6,765,810 B2 | 7/2004 | Perry | |
| 6,819,574 B2 * | 11/2004 | Xu et al. | 363/21.04 |
| 7,075,245 B2 * | 7/2006 | Liu | 315/219 |

FOREIGN PATENT DOCUMENTS

JP 3574849 7/2004

* cited by examiner

*Primary Examiner*—Edward Tso
*Assistant Examiner*—Arun Williams
(74) *Attorney, Agent, or Firm*—Oblon, Spivak, McClelland, Maier & Neustadt, L.L.P.

(57) ABSTRACT

A DC-DC converter includes a switching circuit having first and second switching elements to which a direct current voltage is supplied, the first and second switching elements periodically operated so that one of the switching elements is turned on while the other one is turned OFF during a period other than a dead time period, a serial circuit in which a first capacitor, and primary windings of first and second inductance elements are connected in series, and a connection is made between an output point of the switching circuit and a reference potential point (or input voltage point), and output circuits including rectifier elements, each of which rectifies a voltage induced by secondary windings of the first and second inductance elements, the output circuits obtaining a direct current output voltage.

8 Claims, 7 Drawing Sheets

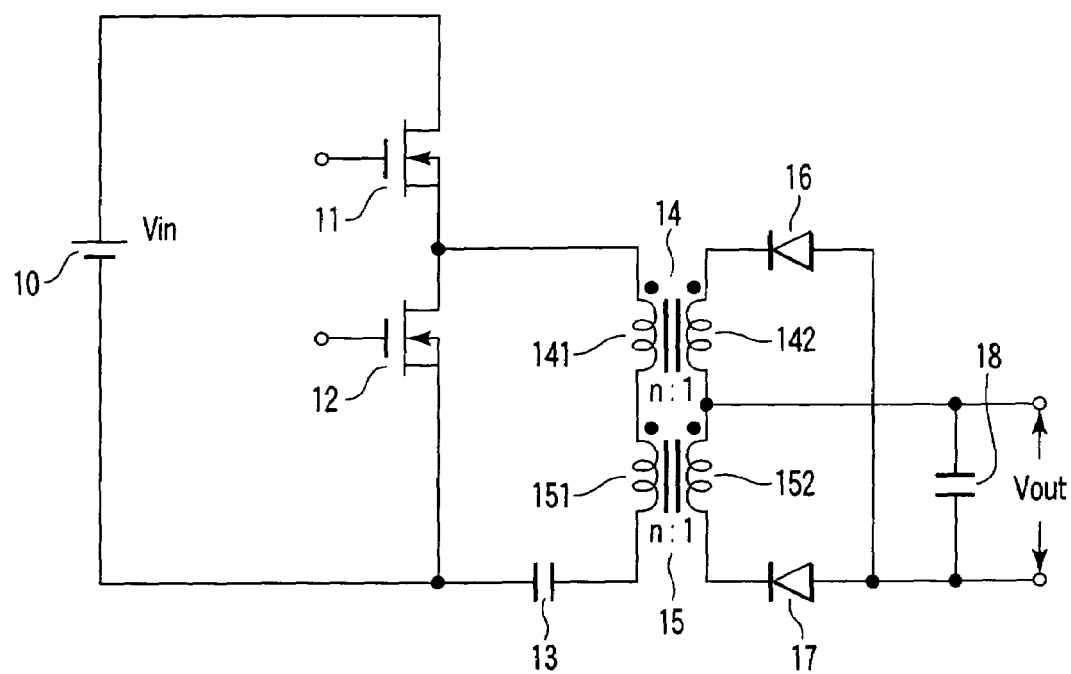
F I G. 7
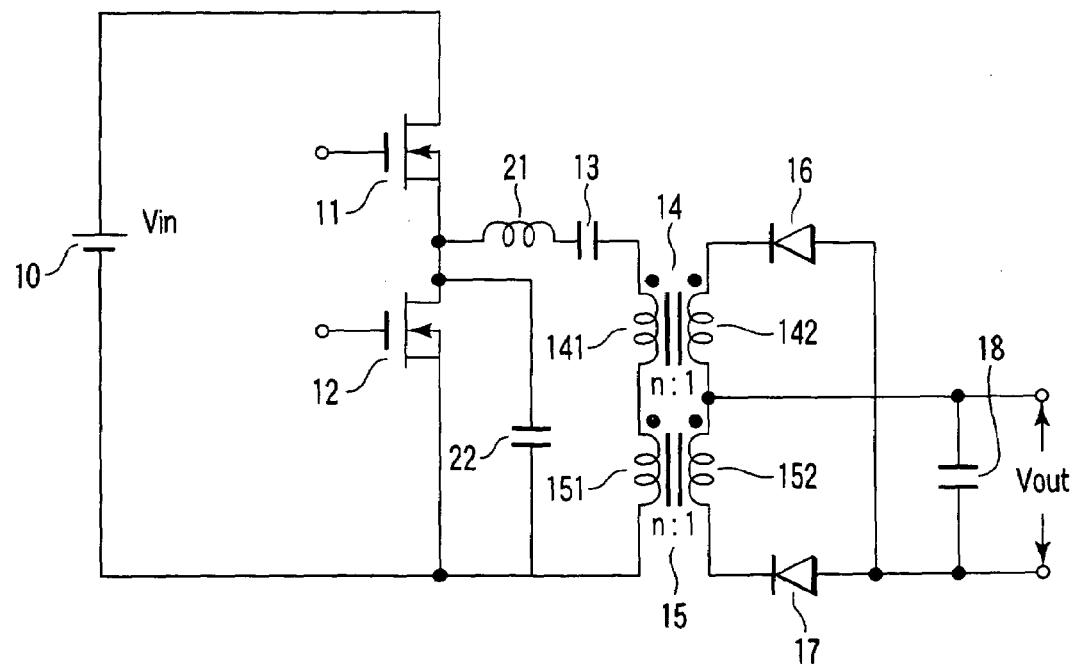
F I G. 8

DC-DC CONVERTER

CROSS-REFERENCE TO RELATED APPLICATIONS

This application is based upon and claims the benefit of priority from prior Japanese Patent Applications No. 2005-259689, filed Sep. 7, 2005, the entire contents of which are incorporated herein by reference.

BACKGROUND OF THE INVENTION

1. Field of the Invention

The present invention relates to a DC-DC converter having a large step-down ratio, and for example, to a DC-DC converter for changing a commercially available power supply voltage into a direct current and then converting the direct current into a low voltage.

2. Description of the Related Art

As is well known, DC-DC converters (direct current to direct current converter circuits) have been conventionally used in order to obtaining a direct current voltage by decreasing a commercially available power supply voltage. As the above DC-DC converters, buck type, boost type, and buck-boost type DC-DC converters are known as those using a transformer and a switching element, for example. In this case, by turning ON/OFF the switching element, an energizing current is supplied to a primary winding of the transformer, and a voltage generated at a secondary winding of the transformer is rectified so as to obtain a direct current output voltage.

In the meantime, in the case of a buck type converter including a transformer, an output voltage can be controlled by controlling an ON/OFF period of the switching element. Basically, assuming that an input voltage is Vin, an output voltage is Vout, a duty of the switching element is D, and a ratio (N1/N2) between the number N1 of primary windings of the transformer and the number N2 of secondary windings is "n", the output voltage Vout is represented by:

$$Vout = D \cdot Vin/n \tag{1}$$

Note that the duty D is indicated by D=Ton/Ts when it is assumed that a switching cycle of the switching element is Ts and an ON period of the switching element is Ton.

Therefore, there is a need for a DC-DC converter having a large step-down ratio to increase the winding number ratio "n" of the transformer. However, when the number of windings is large, a leakage inductance increases, and when a high frequency is produced, a frequency characteristic has been degraded. In addition, the winding number ratio "n" is high, and thus, there has been inconvenience that downsizing is difficult.

For this reason, even when a commercially available power supply voltage can only be stepped down to about 5 volts at most. In the case of obtaining a further lower voltage (for example, 2 to 3 volts), there has been employed a system of temporarily stepping down a voltage to an intermediate voltage, and then stepping up the stepped-down voltage again. In this case, the DC-DC converter is inserted in two stages, and there has been a problem with lowered efficiency and an increased number of parts.

The specification of U.S. Pat. No. 6,728,118 describes an exemplary step-down type DC-DC converter, in which an output voltage is specified in accordance with formula (1) above, and thus, stepping-down operation has been limited.

That is, in the conventional DC-DC converter, it is necessary to increase a winding number ratio of a transformer if an attempt is made to obtain an output voltage converted from a commercially available power supply into a low voltage. Thus, there has been inconvenience that a frequency characteristic is degraded and downsizing is difficult, and also stepping-down operation has been limited.

BRIEF SUMMARY OF THE INVENTION

The present invention has been made in view of the above-described circumstance, and an object of the present invention is to provide a DC-DC converter capable of carrying out further stepping-down operation.

According to one aspect of the present invention, there is provided a DC-DC converter comprising: a switching circuit having first and second switching elements connected in series between a reference potential point and an input voltage point to which a direct current voltage from a direct current voltage source is to be supplied, the switching circuit periodically repeating a period in which one of the switching elements is conductive while the other one of the switching elements is non-conductive; a period in which both of the switching elements are turned OFF; and a period in which the other switching element is conductive while the one of the switching elements is non-conductive; a serial circuit composed of a first capacitor, a first inductance element, and a second inductance element, the first and second inductance elements having primary windings and secondary windings, the first capacitor and the primary windings of the first and second inductance elements being connected in series, and a connection being made between an output point of the switching circuit and the reference potential point or between an output point of the switching circuit and the input voltage point; and output circuits including rectifier elements each of which rectifies a voltage induced by the secondary windings of the first and second inductance elements, the output circuits obtaining a direct current output voltage.

BRIEF DESCRIPTION OF THE SEVERAL VIEWS OF THE DRAWING

FIG. 7 is a circuit configuration diagram adopted to illustrate a second embodiment of a DC-DC converter according to the present invention;

FIG. 8 is a circuit configuration diagram adopted to illustrate a third embodiment of a DC-DC converter according to the present invention;

DETAILED DESCRIPTION OF THE INVENTION

Figure 1:
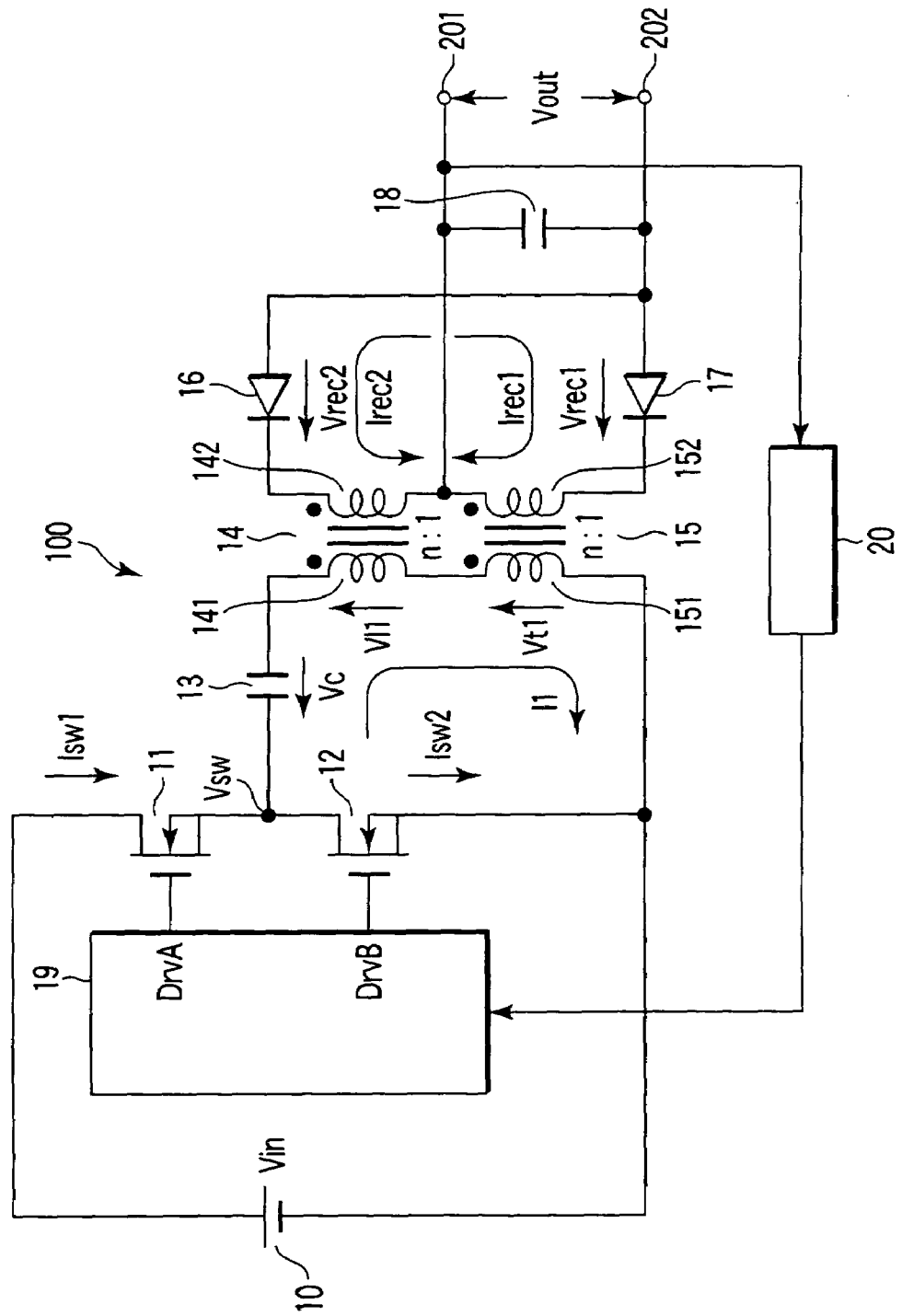
FIG. 1 is a circuit configuration diagram adopted to illustrate a first embodiment of a DC-DC converter according to the present invention.
Figure 2:
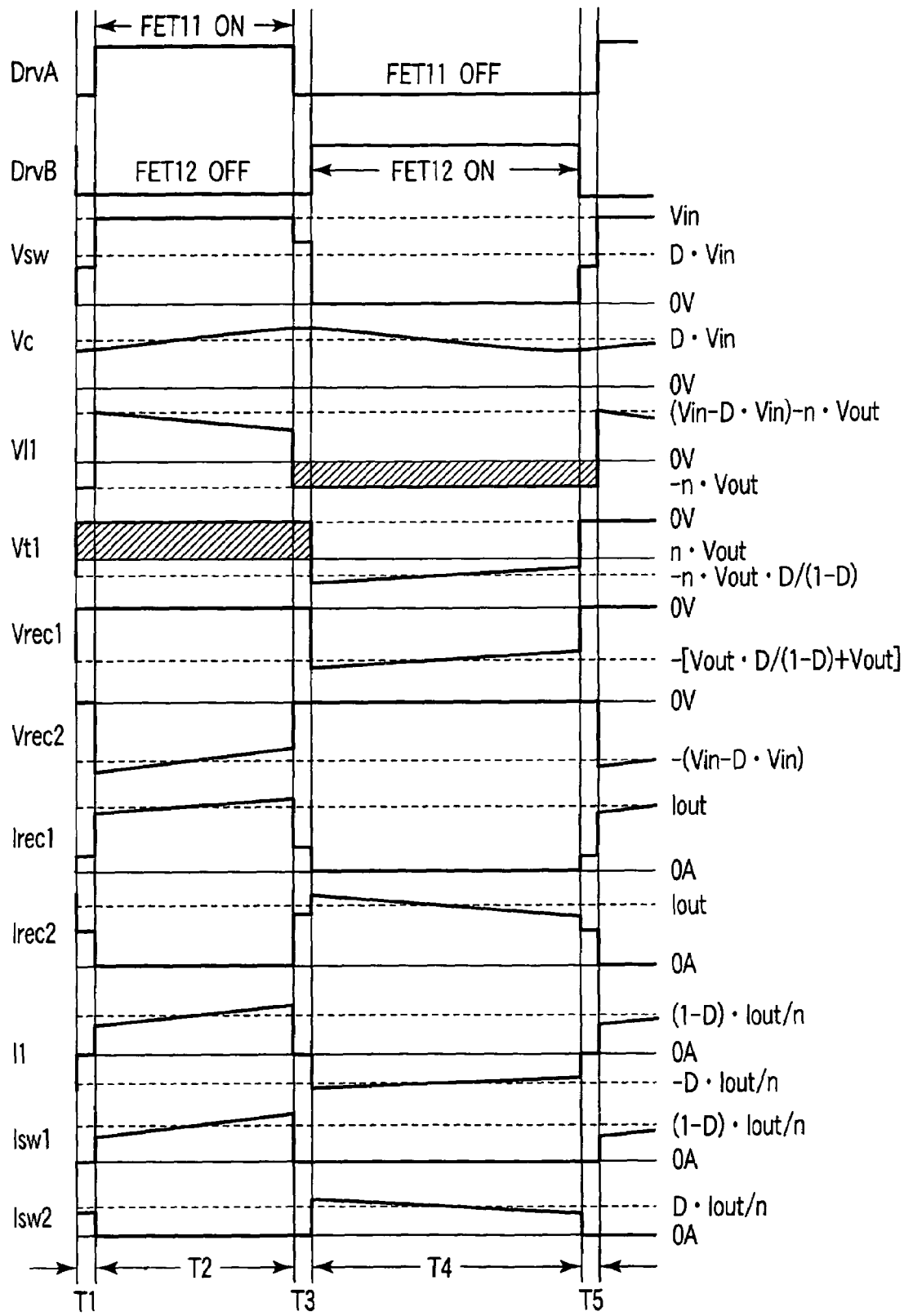
FIG. 2 is a waveform diagram adopted to illustrate a signal waveform of each section in the same embodiment.

Hereinafter, embodiments of the present invention will be described with reference to the accompanying drawings. FIG. 1 is a circuit configuration diagram adopted to illustrate a first embodiment of a DC-DC converter according to the present invention, and FIG. 2 is a waveform diagram adopted to illustrate an operation of the converter.

The DC-DC converter 100 shown in FIG. 1 is supplied with an input voltage Vin from a direct current power supply 10. The direct current power supply 10 is composed of a circuit for rectifying and smoothing a commercially available alternating current (AC) power supply voltage, and can supply a direct current power supply voltage of, for example, 100 V.

One end of a serial circuit between a switching element 11 and a switching element 12 is connected to a positive electrode of the direct current power supply 10. The other end of the serial circuit is connected to a negative electrode (reference potential point) of the direct current power supply 10. The switching element 11 and the switching element 12 form a switching circuit.

The switching elements 11 and 12 are composed of, for example, field effect transistors (FET). Hereinafter, although an example of using an FET as a switching element will be described, these switching elements may be composed of other transistors.

A connection point of the FETs 11 and 12 is connected to a negative electrode of the direct current power supply 10 via a serial circuit configured by a capacitor 13, a primary winding 141 of an inductance element 14, and a primary winding 151 of an inductance element 15.

The inductance elements 14 and 15 are composed of an inductor or a transformer. The embodiment shown in FIG. 1 describes a case in which the inductance element 14 is an inductor (flyback transformer) while the inductance element 15 is a transformer.

A cathode of a diode 16, for example, which is a rectifier element, is connected to one end of a secondary winding 142 of the inductor 14. The other end of the secondary winding 142 of the inductor 14 is connected to one end of a secondary winding 152 of the transformer 15. A cathode of a diode 17 which is a rectifier element is connected to the other end of the secondary winding 152 of the transformer 15.

The other end of the secondary winding 142 of the inductor 14 and one end of the secondary winding 151 of the transformer 15 are connected to an output voltage terminal 201. Each of anodes of the diodes 16 and 17 is connected to an output voltage terminal 202. A output capacitor 18 is connected between the output voltage terminals 201 and 202.

In this first embodiment, a winding number ratio between the primary winding 141 and the secondary winding 142 of the inductor 14 is set to n:1. A winding number ratio between the primary winding 151 and the secondary winding 152 of the transformer 15 is also set to n:1.

In addition, an ON/OFF state of the FETs 11 and 12 is controlled by drive signals DrvA and DrvB from a control IC 19. In this case, the FETs 11 and 12 are controlled so that when one of them is turned ON, the other one is turned OFF.

The control IC 19 controls either of the FETs 11 and 12 so as to be always turned ON in a period other than a dead time period in which both of the FETs 11 and 12 are turned ON in order to prevent both of the FETs 11 and 12 from being conductive at the same time and to prevent zero voltage switching.

Because of zero voltage switching, a capacitor may be connected in parallel to at least one of the FET 11 and FET 12. Also, a parasitic capacity of each of the FETs 11 and 12 can be utilized instead of this capacitor connected in parallel.

In this case, a feedback circuit 20 is connected to the output voltage terminal 201. The feedback circuit 20 detects a voltage of the output voltage terminal 201 and compares the detected voltage with a reference voltage in order to stabilize an output voltage, and then controls the control IC 19 so as to vary an ON/OFF duty of the FETs 11 and 12 according to the comparison result.

Now, an operation of the DC-DC converter 100 according to the first embodiment will be described with reference to FIGS. 2 to 4. FIG. 2 is a waveform diagram showing each section shown in FIG. 1, for illustrating a principle of operation. In ascending order, DrvA and DrvB denote drive signals of the FETs 11 and 12; Vsw denotes a voltage to be applied to the FET 12; Vc denotes a voltage to be applied to a capacitor 13; Vl1 denotes a voltage to be applied to the primary winding 141 of the inductor 14; and Vt1 denotes a voltage to be applied to the primary winding 151 of the transformer 5.

Further, Vrec1 denotes a voltage to be applied to the rectifier element 17; Vrec2 denotes a voltage to be applied to the rectifier element 16; Irec1 denotes a current of the rectifier 17; Irec2 denotes a current of the rectifier element 16; I1 denotes a current of a primary side of the transformer 15; Isw1 denotes a current of the FET 11; and Isw2 denotes a current waveform of the FET 12.

In FIG. 2, a period T2 denotes an ON period of the FET 11, T4 denotes an ON period of the FET 12, and T1, T3 and T5 each denote a dead time period in which both of the FETs are turned OFF.

The FET 11 and FET 12 repeat ON (conductive) state and OFF (non-conductive) state alternately. When the FET 11 is in an ON period (when the FET 12 is in an OFF period), a current is supplied from the direct current power supply Vin via the FET 11, the capacitor 13, and the primary windings 141 and 151 of the inductor 14 and transformer 15, as shown in FIG. 3. At this time, a voltage induced by the secondary windings 142 and 152 of the inductor 14 and transformer 15 is supplied to the rectifier element 17 in a forward direction, and the current Irec1 flows. A reverse voltage is supplied to the rectifier element 16, thus resulting in the non-conductive state.

Figure 4:
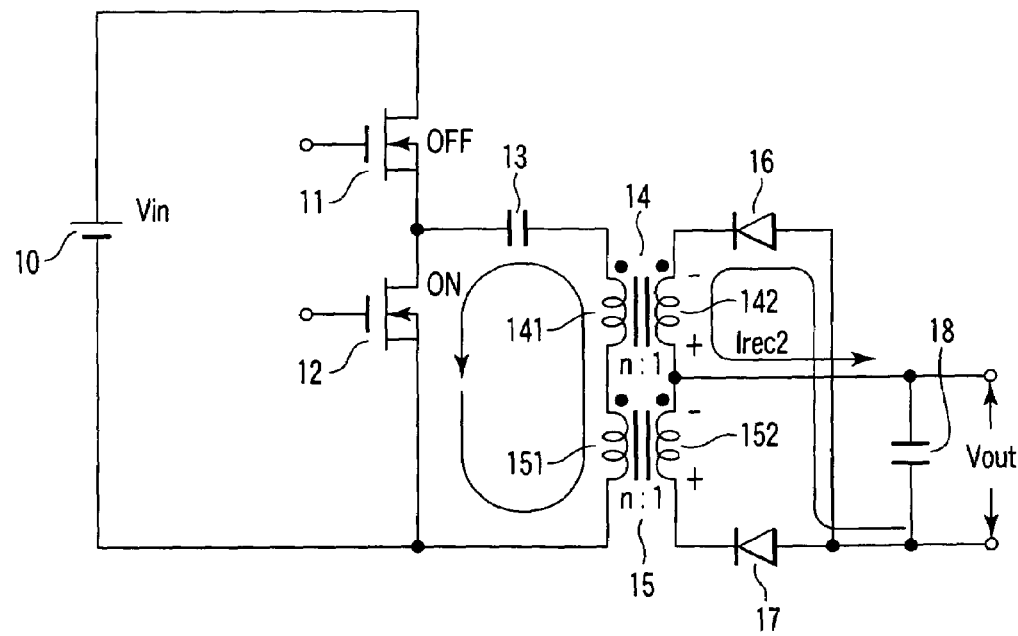
FIG. 4 is a circuit configuration diagram adopted to illustrate an operation in the same embodiment.

On the other hand, in a period in which the FET 12 is turned ON (a period in which the FET 11 is turned OFF), a current flows to the capacitor 13, and the primary windings 141 and 151 of the inductor 14 and transformer 15 through a route of the FET 12, as shown in FIG. 4. At this time, a voltage induced by the secondary windings 142 and 152 of the inductor 14 and transformer 15 is supplied to the rectifier 16 in a forward direction, and the current Irec2 flows. A reverse voltage is supplied to the rectifier element 17, thus resulting in the non-conductive state.

In this manner, the voltage Vt1 to be applied to the primary winding 151 of the transformer 15 shown in FIG. 2, and the voltage Vl1 to be applied to the primary winding 141 of the inductor (period applied by diagonally shaded line) are rectified to the output voltage terminal 201, and the direct current voltage Vout smoothened by the output capacitor 18 can be obtained.

The above operation will be described in more detail. For better understanding of explanation, a voltage fall of the FETs 11 and 12, the inductor 14 and the transformer 15, leakage inductance and dead time of the inductor 14 and the transformer 15, and the like are ignored.

Assuming that an input voltage is Vin; an output voltage is Vout; a voltage to be applied to the capacitor 13 is Vc; a voltage to be applied to the primary winding 141 of the inductor 14 is Vl1; a voltage to be applied to the primary winding 151 of the transformer 15 is Vt1; a current flowing to the capacitor 13, the primary winding 141 of the inductor and the primary winding 151 of the transformer is I1; a period in which the FET 11 is turned On is Ton; a period in which the FET 11 is turned OFF is Toff; and a switching cycle is Ts, the following formula is established:

$$Ts = Ton + Toff \quad (2)$$

At this time, a ratio (duty) of the ON period of the FET 11 is defined as D, and it is defined by the formula below.

$$D = Ton/Ts \quad (3)$$

In addition, assuming that the number of the primary windings 141 of the inductor 14 is Nl1 and the number of the secondary windings 142 is Nl2, a winding number ratio nl1 is defined by the formula below.

$$nl1 = Nl1/Nl2 \quad (4)$$

Similarly, assuming that the number of the primary windings 151 of the transformer 15 is Nt1 and the number of the secondary windings 152 is Nt2, a winding number ratio nt1 is defined by the formula below.

$$nt1 = Nt1/Nt2 \quad (5)$$

In order to minimize a ripple voltage of an output voltage, nl1 may be equal to nt1, and is defined by the following formula.

$$n = nl1 = nt1 \quad (6)$$

At this time, the voltage Vc to be applied to the capacitor 13 is represented by the formula below.

$$Vc = D \cdot Vin \quad (7)$$

Figure 3:
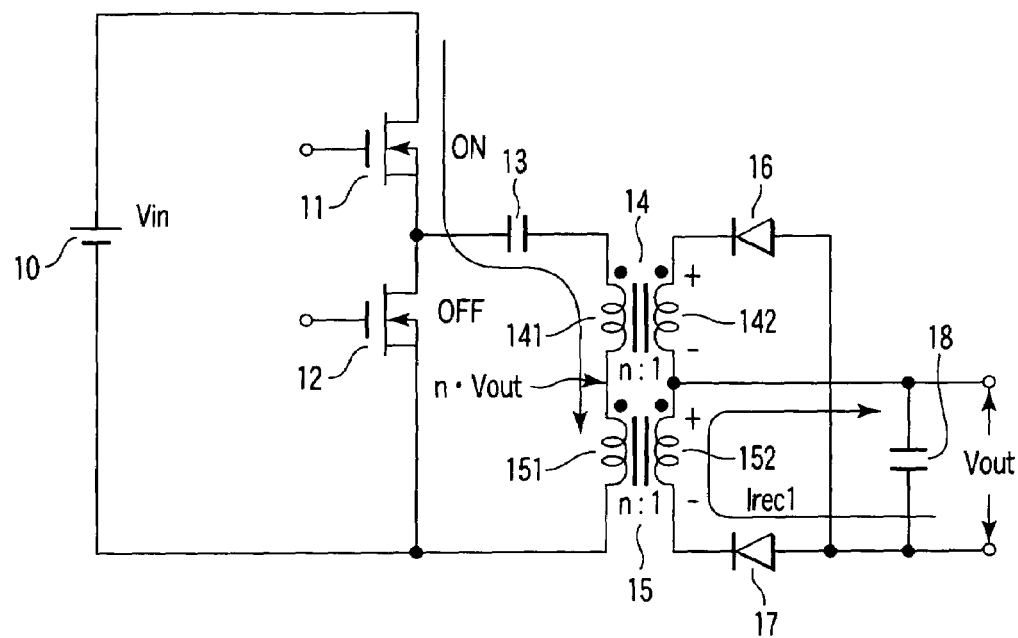
FIG. 3 is a circuit configuration diagram adopted to illustrate an operation in the same embodiment.

In FIG. 3, a voltage of the capacitor 13 is D·Vin, and a voltage n·Vout which is "n" times of the output voltage Vout is generate at a connection point between the primary winding 141 of the inductor 14 and the primary winding 151 of the transformer 15. Thus, a voltage at both ends of the primary winding 141 of the inductor 14 is obtained as follows:

Vin−D·Vin−n·Vout

In this manner, when an inductance of the primary winding 141 of the inductor 14 is L; a change of a current flowing to the primary winding 141 in the Ton period is ΔI1on; and a change of a current flowing to the primary winding 141 in the Toff period is ΔI1off, the following formulas (8) and (9) are established:

$$\Delta I1pn = (Vin - D \cdot Vin - n \cdot Vout) \cdot Ton/L \quad (8)$$

$$\Delta I1off = n \cdot Vout \cdot Toff \cdot L \quad (9)$$

Figure 5:
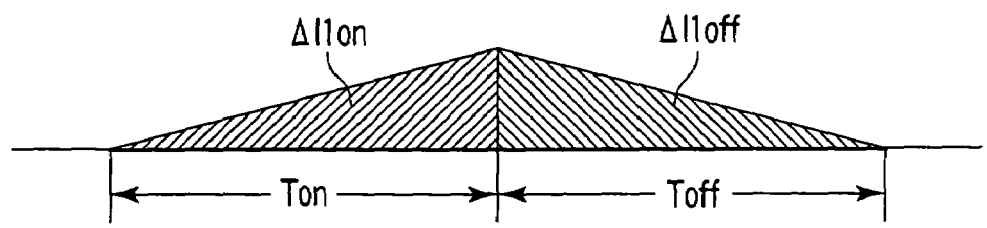
FIG. 5 is a current waveform diagram adopted to illustrate an operation in the same embodiment.

As shown in FIG. 5, the current ΔI1on is a current for energizing the inductor 14, and rises with a predetermined gradient. The current ΔI1off is a current for discharging energization energy of the inductor 14, and falls with a predetermined gradient. In a mode in which such a current is continuous, the following formula (10) is established:

$$\Delta I1off = \Delta I1on \quad (10)$$

Here, when an output voltage Vout in such a mode in which a current is continuous is obtained by formulas (3) and (8) to (10), the following formula (11) is established:

$$Vout = D \cdot (1-D) \cdot Vin/n \quad (11)$$

In formula (11), (1−D) is multiplied with respect to formula (1) in the conventional buck type converter. Thus, it is found that a step-down ratio is further higher as compare with a conventional converter. Further, it is found that, in formula (11), Vout is reduced even if Vout is the maximum when D=0.5 and D is greater or smaller than 0.5.

When formula (11) is solved with respect to D, two values are obtained. When 0<D<0.5, the following formula can be established:

$$D = \frac{1 - \sqrt{1 - \frac{4nVout}{Vin}}}{2}$$

When 0.5<D<1, the following formula can be established:

$$D = \frac{1 + \sqrt{1 - \frac{4nVout}{Vin}}}{2}$$

Figure 6:
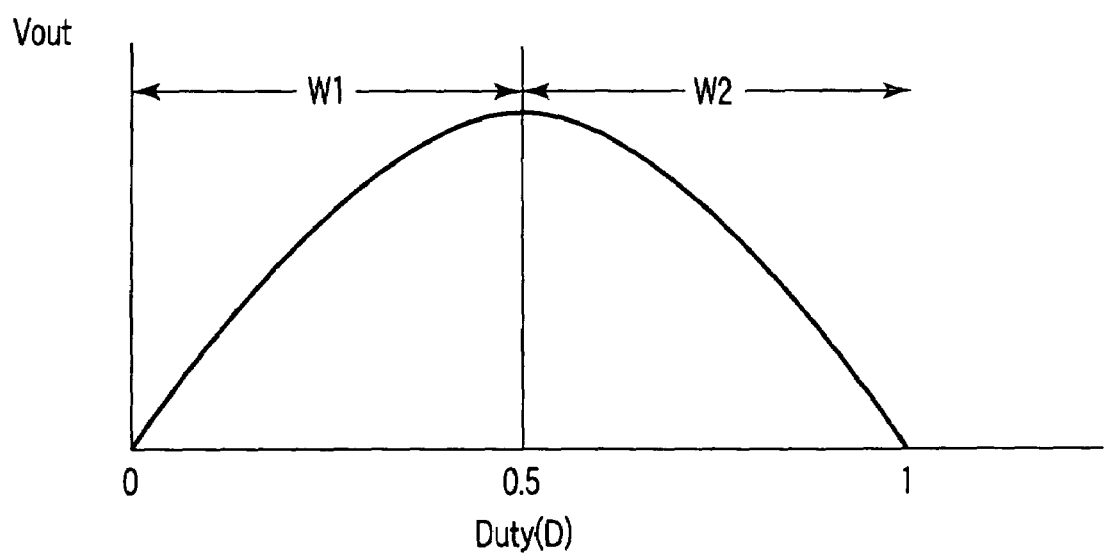
FIG. 6 is a characteristic view of an output voltage adopted to illustrate an operation in the same embodiment.

Therefore, in the case where the output voltage is returned to the control IC 19 via the feedback circuit 20, thereby configuring a stabilized power supply, it is necessary to control the control IC 19 so as to operate in one of a range W1 of 0<D<0.5 and a range W2 of 0.5<D<1 and so as to apply limitation to a duty, as shown in FIG. 6.

As has been described above, according to the DC-DC converter of the first embodiment, the output of the switching element (connection point between the FETs 11 and 12) is connected to the serial circuit between the inductor 14 and the transformer 15 via the capacitor 13, and the differential voltage (Vin−D·Vin) between the input voltage Vin and the voltage D·Vin applied to the capacitor 13 is power-transmitted to a secondary side by means of the inductor 14 and the transformer 15. In this manner, an output voltage increased by multiplying (1−D) can be obtained as compared with the conventional step-down type converter, so that a converter having a high step-down ratio can be configured. Consequently, a voltage which is as low as 3.3 V or 2.5 V can be obtained from an input voltage of 100 V, which leads to improvement of efficiency and reduction of the number of parts.

FIG. 7 shows a second embodiment of a DC-DC converter according to the present invention. In the embodiment, the capacitor 13, the primary winding 141 of the inductor, and the primary winding 151 of the transformer may be connected to one another in series. Thus, FIG. 7 shows a state in which an insert position of the capacitor 13 is allocated at a position different from that shown in FIG. 1, for example, at the other end of the transformer 15.

FIG. 8 shows a third embodiment of a DC-DC converter according to the present invention. An inductor 21 and a capacitor 22 are added in order to improve a switching loss of the FETs 11 and 12. The inductor 21 is connected in series between a connection point of the FETs 11 and 12 and the capacitor 13. The capacitor 22 is connected in parallel to the FET 12. The inductor 21 and capacitor 22 configure a resonator circuit, and also configures a zero volt switch ZVS for improving a power loss when the switching elements 11 and 12 are turned OFF. Note that the capacitor 22 may be connected in parallel to the FET 11.

Figure 9:
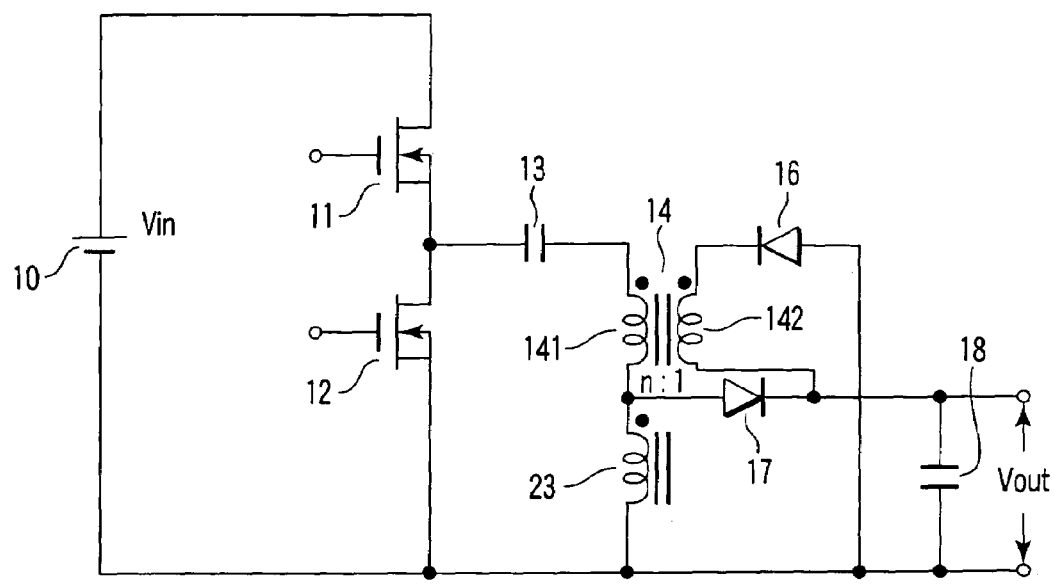
FIG. 9 is a circuit configuration diagram adopted to illustrate a fourth embodiment of a DC-DC converter according to the present invention.

FIG. 9 shows a fourth embodiment of a DC-DC converter according to the present invention. In order to make the transformer 15 non-insulating, this converter is composed of a single winding transformer 23. In this manner, groundings on the primary side and the secondary side can be used in common. In addition, in order to achieve non-insulation, the transformer 23 may be changed to a single winding inductor.

Figure 10:
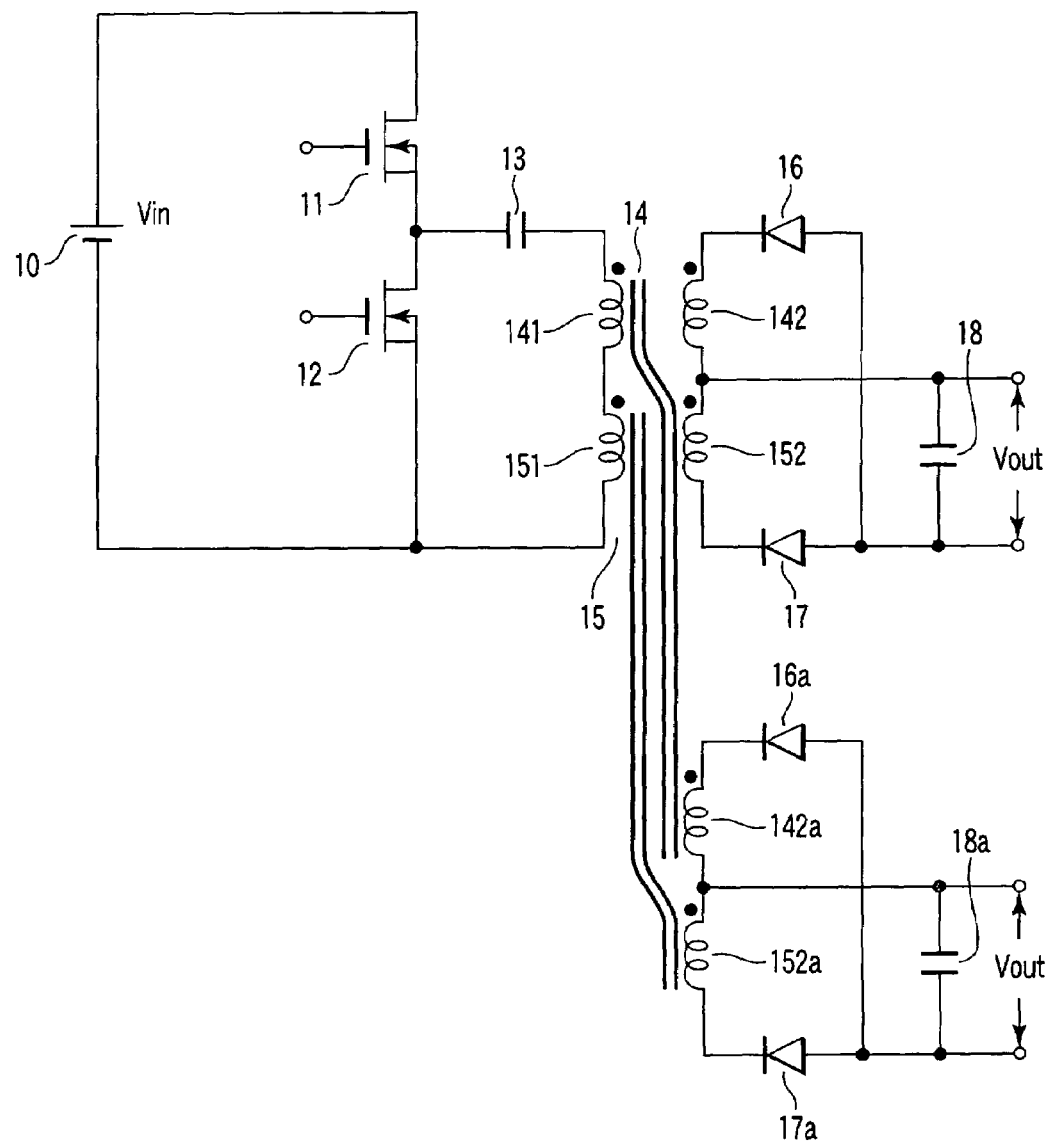
FIG. 10 is a circuit configuration diagram adopted to illustrate a fifth embodiment of a DC-DC converter according to the present invention.

FIG. 10 shows a fifth embodiment of a DC-DC converter according to the present invention. According to the present embodiment, the secondary winding of at least one of the inductor 14 and the transformer 15 is composed of a plurality of windings, thereby promoting multiple outputs. FIG. 10 shows an example of the secondary windings of both of the inductor 14 and the transformer 15 composed of double windings. More specifically, multiple outputs are achieved by adding an inductor 142a electromagnetically coupled to the primary winding 141 of the inductor 14 and a transformer winding 152a electromagnetically coupled to the primary winding of the transformer 15, and similarly, additionally connecting rectifier elements 16a and 17a and a smoothing capacitor 18a.

Figure 11:
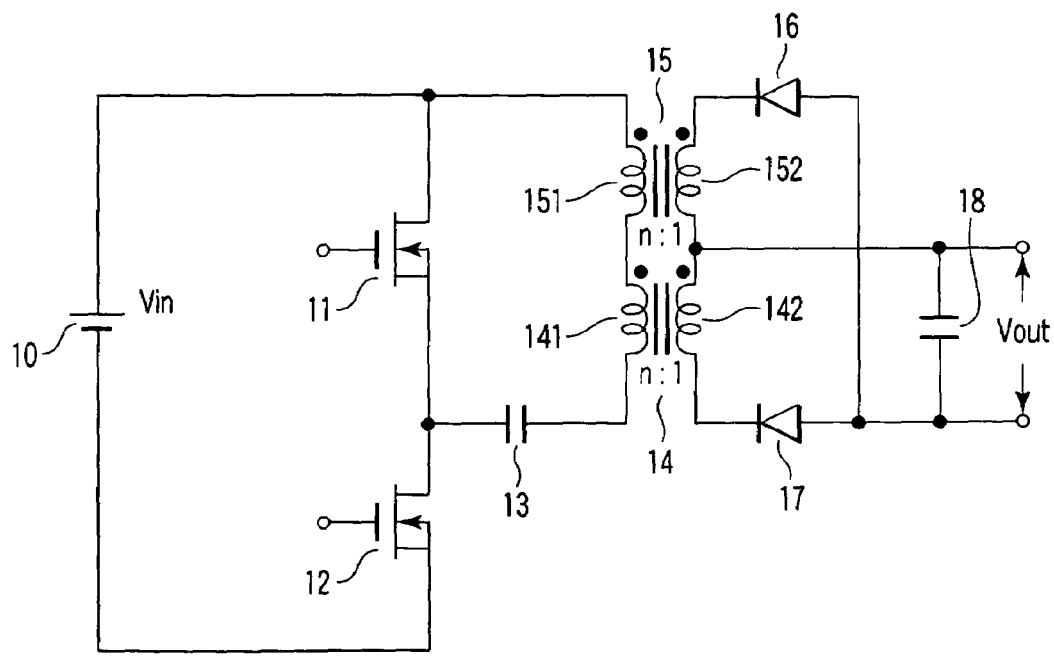
FIG. 11 is a circuit configuration diagram adopted to illustrate a sixth embodiment of a DC-DC converter according to the present invention.

FIG. 11 shows a sixth embodiment of a DC-DC converter according to the present invention. According to the present embodiment, the other end of the primary winding 151 of the transformer 15 is connected to a positive side of the input voltage Vin. In this case as well, the function and advantageous effect similar to those shown in FIG. 1 can be attained.

Further, although not shown, the positions of the inductance 14 and the transformer 15 may be exchanged with each other, or polarity of the output voltage can be changed by reversing the rectifier elements 16 and 17 in polarity.

As has been described above, according to the present invention, a low voltage output produced by multiplying (1−D) can be obtained in the buck type DC-DC converter. Therefore, even if a winding number ratio between the primary windings and the secondary windings of the inductor and the transformer is reduced as compared with the conventional converter, a sufficiently stepped-down output voltage can be obtained. Consequently, a leakage inductance can be reduced, and a DC-DC converter having a stable frequency characteristic can be provided.

The present invention is not limited to the above-described embodiments. At the stage of carrying out the invention, the present invention can be embodied by variously modifying constituent elements without deviating from the spirit of the invention. In addition, a variety of inventions can be formed by properly combining a plurality of constituent elements disclosed in the above-described embodiments with each other. For example, some of all the constituent elements shown in the embodiments may be eliminated. Further, different constituent elements according to the embodiments may be properly combined with each other.

What is claimed is:

1. A DC-DC converter comprising:
a switching circuit having first and second switching elements connected in series between a reference potential point and an input voltage point to which a direct current voltage from a direct current voltage source is to be supplied, the switching circuit periodically repeating a period in which one of the switching elements is conductive while the other one of the switching elements is non-conductive; a period in which both of the switching elements are turned OFF; and a period in which the other switching element is conductive while the one of the switching elements is non-conductive;
a serial circuit composed of a first capacitor, a first inductance element, and a second inductance element, the first and second inductance elements having primary windings and secondary windings, the first capacitor and the primary windings of the first and second inductance elements being connected in series, and a connection being made between an output point of the switching circuit and the reference potential point or between an output point of the switching circuit and the input voltage point, and the first capacitor being across a path through which energy is transmitted from the primary windings to the secondary windings of the first and second inductance elements to prevent saturation of the first and second inductance elements; and
output circuits including rectifier elements, each of which rectifies a voltage induced by the secondary windings of the first and second inductance elements, the output circuits obtaining a direct current output voltage.

2. A DC-DC converter according to claim 1, wherein, assuming that an input voltage from the direct current voltage source is Vin; the direct current output voltage is Vout; and a ratio of a conductive period to a switching cycle of the one switching element is D, Vout=D·(1−D)·Vin is established.

3. A DC-DC converter according to claim 1, wherein, assuming that the first and second inductance elements set to "n" a winding number ratio between the number of the primary windings and the number of the secondary windings; an input voltage from the direct current voltage source is Vin; the direct current output voltage is Vout; and a ratio of a conductive period to a switching cycle of the one switching element is D, Vout=D·(1−D)·Vin/n is established.

4. A DC-DC converter according to claim 1, wherein, in the first and second switching elements, control of conduction or non-conduction is made by a control circuit, and a ratio between a conduction period and a non-conduction period is controlled in response to a change of the direct current output voltage.

5. A DC-DC converter according to claim 1, wherein either of the first and second inductance elements is a transformer, and the other one is an inductor.

6. A DC-DC converter according to claim 1, further comprising:
means for connecting an inductor between an output point of the switching circuit and the serial circuit; and
means for connecting a second capacitor in parallel to at least one of the first and second switching elements.

7. A DC-DC converter according to claim 1, wherein, at least one of the first and second inductance elements has a plurality of secondary windings, includes rectifier elements which rectifies a voltage induced by the respective secondary windings, and outputs a direct current output voltage in a multiple manner.

8. A DC-DC converter comprising:
a switching circuit having first and second switching elements connected in series between a reference potential point and an input voltage point to which a direct current voltage from a direct current voltage source is to be supplied, the switching circuit periodically repeating a period in which one of the switching elements is conductive while the other one of the switching elements is non-conductive; a period in which both of the switching elements are turned OFF; and a period in which the other switching element is conductive while the one of the switching elements is non-conductive;
a serial circuit composed of a capacitor, a first inductance element, and a second inductance element, the first inductance element having a primary winding and a secondary winding, the capacitor, the primary winding of the first inductance element, and the second inductance element being connected in series, and a connection being made between an output point of the switching circuit and the reference potential point or between an output point of the switching circuit and the input voltage point, and the capacitor being across a path through which energy is transmitted from the primary winding to the secondary winding of the first inductance element to prevent saturation of the first and second inductance elements; and an output circuit including rectifier elements, each of which rectifies a voltage induced by the secondary winding of the first inductance element and the secondary inductance element, the output circuits obtaining a direct current output voltage.

* * * * *